United States Patent
Desai et al.

(10) Patent No.: US 10,990,501 B2
(45) Date of Patent: *Apr. 27, 2021

(54) MACHINE LEARNING SYSTEM FOR WORKLOAD FAILOVER IN A CONVERGED INFRASTRUCTURE

(71) Applicant: VMware, Inc., Palo Alto, CA (US)

(72) Inventors: Aalap Desai, Palo Alto, CA (US); Anant Agarwal, Palo Alto, CA (US); Alaa Shaabana, Palo Alto, CA (US); Ravi Cherukupalli, Palo Alto, CA (US); Sourav Kumar, Palo Alto, CA (US); Vikram Nair, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,039

(22) Filed: Feb. 7, 2020

(65) Prior Publication Data

US 2020/0174904 A1 Jun. 4, 2020

Related U.S. Application Data

(63) Continuation of application No. 16/043,297, filed on Jul. 24, 2018, now Pat. No. 10,585,775.

(51) Int. Cl.
| | |
|---|---|
| *G06F 11/34* | (2006.01) |
| *G06F 9/455* | (2018.01) |
| *G06K 9/62* | (2006.01) |
| *G06N 20/00* | (2019.01) |

(52) U.S. Cl.
CPC ...... *G06F 11/3457* (2013.01); *G06F 9/45558* (2013.01); *G06K 9/6223* (2013.01); *G06K 9/6248* (2013.01); *G06N 20/00* (2019.01); *G06F 2009/45591* (2013.01)

(58) Field of Classification Search
CPC .............. G06F 11/0751; G06F 11/079; G06F 11/3409; G06F 11/0709; G06F 11/0793; G06F 11/0754; G06F 2201/865
See application file for complete search history.

(56) References Cited

U.S. PATENT DOCUMENTS

| | | | | |
|---|---|---|---|---|
| 9,384,115 | B2 * | 7/2016 | Elisha | H04L 41/0806 |
| 9,424,063 | B2 * | 8/2016 | Kirubanandam | G06F 11/0709 |
| 9,916,170 | B2 * | 3/2018 | Sampathkumar | G06F 9/45508 |
| 2015/0309826 | A1 * | 10/2015 | Kirubanandam | G06F 9/45558 718/1 |
| 2016/0224898 | A1 * | 8/2016 | Ryckbosch | G06F 11/3409 |
| 2017/0060720 | A1 * | 3/2017 | Ramanath | H04L 43/50 |
| 2017/0322827 | A1 * | 11/2017 | Little | G06F 11/3428 |
| 2018/0285190 | A1 * | 10/2018 | Tan | G06F 11/0781 |

\* cited by examiner

*Primary Examiner* — Matthew M Kim
*Assistant Examiner* — Matthew N Putaraksa
(74) *Attorney, Agent, or Firm* — Thomas | Horstemeyer LLP

(57) ABSTRACT

Systems and methods for analyzing a customer deployment in a converged or hyper-converged infrastructure are disclosed. A machine learning model is trained based upon historical usage data of other customer deployments. A k-means clustering is performed to generate a prediction as to whether a deployment is configured for optimal failover. Recommendations to improve failover performance can also be generated.

20 Claims, 5 Drawing Sheets

MACHINE LEARNING SYSTEM FOR WORKLOAD FAILOVER IN A CONVERGED INFRASTRUCTURE

CROSS-REFERENCE TO RELATED APPLICATIONS

This application is a continuation of and claims the benefit of U.S. patent application Ser. No. 16/043,297, entitled "MACHINE LEARNING SYSTEM FOR WORKLOAD FAILOVER IN A CONVERGED INFRASTRUCTURE," and filed Jun. 24, 2018, which is hereby incorporated by reference in its entirety.

BACKGROUND

A converged or hyper-converged infrastructure can provide an enterprise with modular and expandable central processing unit (CPU), memory, storage, and/or network resources as well as system backup and recovery. In converged and hyper-converged infrastructures, CPU, memory, storage, and sometimes network resources are brought together using preconfigured and integrated hardware. Tasks can be allocated to hardware that is capable of performing the allotted task. When a task or workload requires more resources, additional hardware can be assigned to the task, for example, using virtualization software.

Tasks, such as applications or virtual machines, can be allocated across a fleet of physical host machines in the converged environment. A particular enterprise or user can deploy a cluster of virtual machines across one or more physical host machines in the converged environment. Users of the environment can be faced with questions concerning how to plan for failover within the environment. A user might consider how many physical host machines or hosts to provision in a deployment for failover purposes. A user might also consider whether their cluster of virtual machines will restart with minimal or significant disruption in the event of a host failure. In cloud environments where users or enterprises are charged according to a pay-per-use model, the user might wish to ensure that their cluster of virtual machines is neither under-provisioned nor over-provisioned. Under-provisioning can impair failover performance of a deployment. Over-provisioning can result in wasting computing resources. Therefore, improved mechanisms for predicting failover can help an administrator of a hyper-converged infrastructure allocate resources in an efficient manner.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
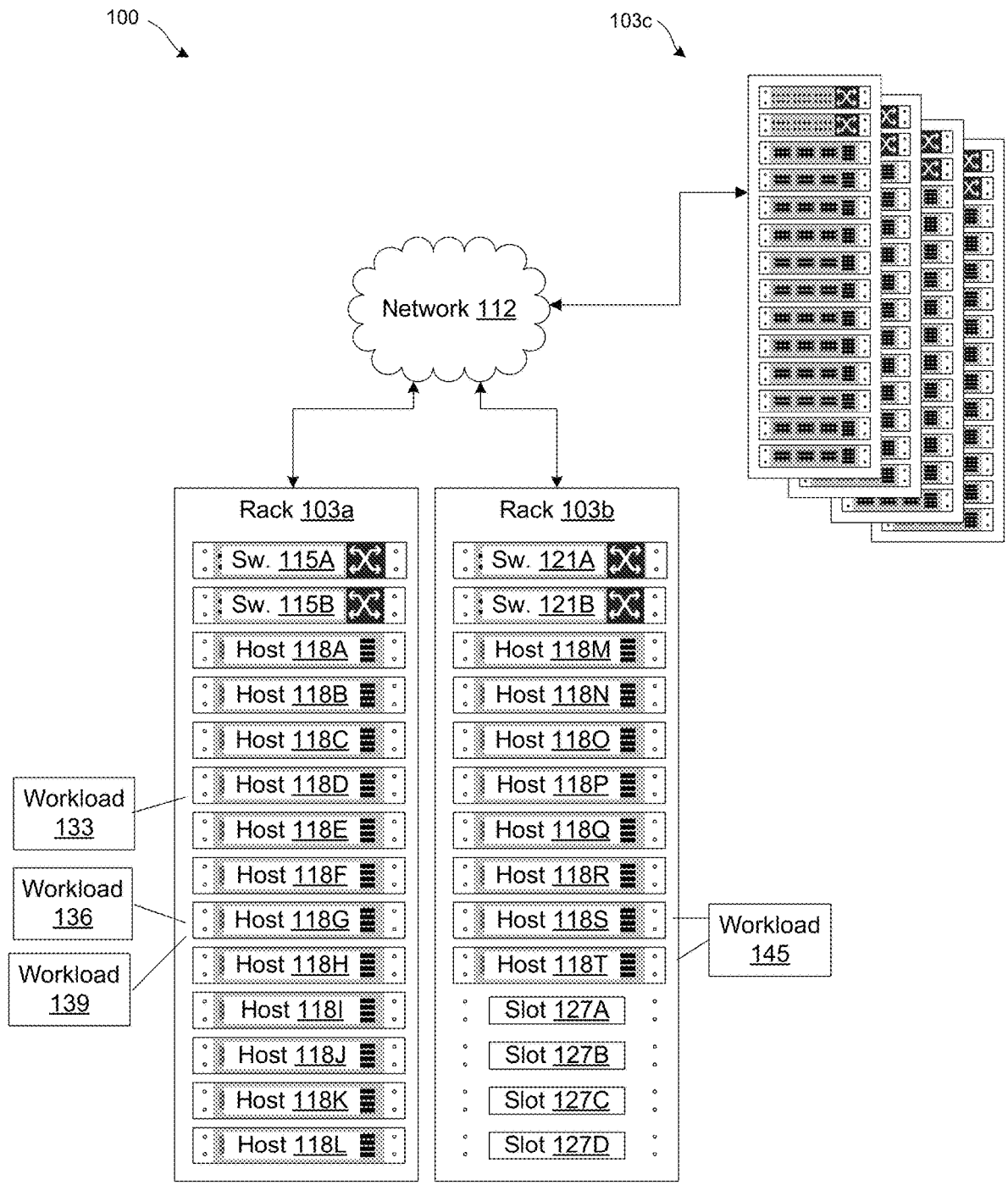
FIG. 1 is a drawing of an example of a cloud environment including components connected through a network.

The present disclosure relates to facilitating failover of workloads, such as virtual machines or applications, within a converged or hyper-converged infrastructure (HCI) that provides CPU, memory, storage, and potentially network resources that are brought together using integrated hardware. For example, a set of CPU, memory, and storage resources can be allocated within a hyper-converged infrastructure to provide a streaming video platform, an email server, a document management system, or any cluster of virtual machines for an enterprise or user that requires CPU and memory resources and that can be implemented within a HCI. Accurately allocating physical host machines within the HCI, such as CPU, memory, and storage resources, can be an important factor in ensuring failover as well as an appropriate level of performance for the system.

Administrators are often faced with a problem of determining how to cope with the failure of one or more physical host machines that are allocated to one or more virtual machines in a virtual machine cluster associated with an enterprise. With the advent of the hybrid cloud, where deployments are made in a pay-per-use environment hosted by third party cloud services providers, allocating an appropriate amount of resources to failover questions becomes a significant question. Solving failover issues can create different problems in an on-premises deployment because resource availability differs across different platforms. In some systems, such as VMware vSphere environments, admission control policies govern how failover is handled.

Examples of this disclosure employ machine learning models trained on telemetry data from various customer configurations to reduce resource wastage, increase cost savings, and maintain and maximize the availability and performance of a particular cluster of VMs. Recommendations for possible admission control policies can be generated to enhance uptime and reduce resource wastage. Examples of this disclosure provide a platform-agnostic framework for recommending admission control policy settings based on simulations of the failure of physical host machines and a statistical analysis of the settings of a VM cluster. Machine learning models can analyze customer configurations related to failover settings and recommend a series of actions that the customer can take to optimize failover settings.

Cloud computing offers the potential for more cost-effective implementations of various systems and platforms as opposed to implementing a platform using in-house resources. Utilizing an HCI or cloud infrastructure removes the need for tenants of the infrastructure to maintain their own complex computing infrastructures themselves. However, the costs of implementing systems in the cloud are typically related to the amount of CPU, memory, storage, and network resources consumed by the system. Therefore, an important consideration is accurately allocating resources to avoid over-provisioning or under-provisioning when it comes to failover planning, both of which lead to potentially higher costs to the customer. Over-provisioning wastes resources that could be put to other uses or can create unnecessary costs for a customer. Under-provisioning resources can result in workloads failing to restart or restarting with resource disruption, which can impact performance, uptime and also cause potential service level agreement (SLA) violations.

Current capacity techniques for workload clusters can utilize admission control policies to reserve failover resources. Admission control policies can be specified by an administrator for a deployment or cluster of workloads within a HCI. Admission control policies can specify various options for a cluster of workloads. One admission control policy can specify a failover level policy. The failover level policy can specify number of number of physical host machine failures in a cluster that can be tolerated by a corresponding cluster of virtual machines executing on the hosts while providing sufficient CPU and memory resources for failover of the virtual machines. In other words, a failover level policy of two specifies that the cluster of VMs can tolerate the failure of two physical host machines such that the VMs executing on the failed host can failover to the remaining physical hosts allocated to the enterprise in the HCI. Such a policy has a cost to the enterprise paying for resources within the HCI because CPU and memory must be set aside or reserved for failover purposes, so the enterprise is ostensibly paying for more resources that it is using at first to account for failover.

Another example of an admission control policy is a resource reservation policy. In this example, an administrator can specify a certain percentage of CPU or memory resources in the allocated physical host machines that are set aside for failover purposes. For example, the administrator can specify that 50% of CPU and/or memory resources are unallocated to VMs to account for failover. If one or more physical host machines fails, the reserved resources can be brought to bear to service the VMs running on the failed physical host machine. Again, in a hybrid cloud environment, an enterprise must pay for allocated CPU and memory resources, so this also has a cost.

As a third example of an admission control policy, a failover host policy can be used. In this scenario, a particular physical host machine can be set aside for failover purposes. If one or more physical host machines fail, the physical host machine that is set aside can be utilized to replace the failed host machine. Again, in a hybrid cloud environment, an enterprise must pay for allocated CPU and memory resources, so such an admission control policy also has a cost.

With reference to FIG. 1, shown is an example of a cloud environment 100. The cloud environment 100 can have components including one or more racks 103a and 103b in communication with one another over a network 112. The racks 103 can include computing resources, such as CPU, storage, and memory resources that comprise a converged or hyper-converged environment. A multi-tenant environment can be implemented in which various tenants or customers can implement their respective virtual data centers (VDC's) within the multi-tenant environment. For example, a tenant can implement a streaming video platform among various virtual machines and storage nodes that are implemented across various host devices within the cloud environment 100. A separate tenant can implement a website in a different VDC using common or separate host devices within the cloud environment 100. Each tenant can request additional resources to be allocated to their respective workloads, and a cloud management service can assign the specific physical resources within the cloud environment 100 as requested.

In the context of this disclosure, a tenant or enterprise customer of the cloud environment 100 can obtain what is referred to herein as a physical host machine for deploying one or more VMs. Such a physical host machine can represent a portion of a machine in a rack 103 or multiple machines in a rack 103. Accordingly, a physical host machine in this context can represent an assemblage of CPU and memory resources taken from one or more physical machines provided by the cloud environment 100 that together represent a machine assigned to an enterprise customer.

Returning to FIG. 1, the network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks. The network 112 can also include switches, routers, and other network devices. The network devices can include network devices that are held or integrated within racks and network devices that are external to the racks.

A rack 103 can be part of a hyper-converged infrastructure and contain compute, memory, storage, and network resources that are provided using integrated and/or preconfigured hardware. In other cases, a rack can be part of a converged infrastructure or another type of infrastructure. The rack 103 can contain various networking, computing, and storage hardware atop of which various workloads belonging to various tenants can be implemented. In one example, a rack 103 can have one or more network switches, or slots for switches or other network devices. For example, the rack 103 can have switches 115A and 115B. The switches 115A and 115B can be top-of-rack switches or other integrated network devices of the rack 103. While not shown, the switches 115 can also be further connected to other switches and network devices of the site 109, including spine switches, End-of-Row switches, Middle-of-Row switches, or other switches, routers, and the like. The switches 115 can also be connected to routers, which can route traffic between racks or between sites. The rack 103 can also include a number of hosts, or a preconfigured number of slots or bays for hosts. In the context of this disclosure, a host can comprise a computing device with CPU, memory, or storage resources that can be assigned to one or more workloads executing within the cloud environment 100.

For example, the rack 103 can have hosts 118A-118L (collectively, "hosts 118"). Where the rack 103 is part of a hyper-converged infrastructure, each of the hosts 118 can provide various levels of CPU, memory, storage, and network resources. Each of the hosts 118 can be connected to the network 112 through the switches 115A and 115B. For example, the host 118 can include two NICs connected to the switches 115A and 115B. Individual ones of the hosts 118 can be connected to both a port of the switch 115A and a port of the switch 115B. While the hosts 118 are connected to the network 112 through the switches 115A and 115B, the switches 115A and 115B can be considered a part of the network 112, as can network cards or controllers of the individual hosts.

Similarly, other racks 103 within the environment, such as rack 103b, can include hosts, or a quantity of slots or bays for hosts. For example, the rack 105 can have hosts 118M-118T as well as slots 127A-127D (slots 127). The slots 127 can accommodate or accept additional hosts to expand the CPU, memory, storage, network, and other resources provided by the rack 105. Where the rack 105 is part of a hyper-converged infrastructure, each of the hosts 118 can provide compute, memory, and network resources. The hosts 118 can be connected to the network 112 through the switches 121A and 121B. For example, individual ones of the hosts 118 can be connected to both a port of the switch 121A and a port of the switch 121B.

Each of the hosts 118, or host devices, can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The network devices can include network interface controllers or network interface cards (NICs), switches, routers, and other network devices. The hosts can be utilized to perform or execute instructions, including processes, programs, applications, and other tasks that can be utilized in concert, for example, using software like the cloud management platform 203, VMware vSphere®, vSAN®, NSX®, ESX®, ESXi®, and other virtualization software or tools.

Additionally, the hosts 118 can vary in their respective capabilities. For example, host 118A might be configured with multiple high performance processors and limited storage resources, while host 118B is configured with limited CPU resources and ample mass storage resources that can be used by various tenants within the cloud environment 100. The racks 103 can be part of a single site or as a part of a geographically disparate configuration of various racks 103. In some cases, one or more of the sites can be provided by a service that provides CPU, memory, storage, network, and other resources to an enterprise or another customer of the service. In other cases, one or more of the sites can also be owned or operated by the enterprise.

Software instructions can provide and assign resources using containers called workload domains. A workload domain can be one or more workloads that is a physical collection of compute, memory, storage, and network resources that provide uniform characteristics to applications and tasks such as security, data protection, performance, availability, and modular expandability. A workload domain can perform or execute tasks, including applications, programs, and other instructions. Workload domains can provide a virtual machine for a user, infrastructure as a service (IaaS), platform as a service (PaaS), desktop as a service (DaaS)/virtual desktop infrastructure (VDI), or other compute tasks. These can be considered workload domain types, and workload domain types can further include test and development workload domain types, production workload domain types, and other domain types that can include any of these services or a combination of these and other services.

An enterprise can also request a cluster of physical host machines from the cloud environment 100 and run a cluster of workloads or virtual machines on them. The cluster of virtual machines can support a workload domain with computing resources.

Referring back to FIG. 1, the hosts 118D and 118G can be assigned to workloads 133, 136, and 139, respectively. In other words, these workloads can be executed on hosts 118D and 118G within the HCI. In one example, these workloads 133, 136, and 139 can represent virtual machines or applications that are executed on the hosts 118. Workload 145 can be executed by hosts 118S and 118T. In this example, additional physical resources that span multiple hosts 118 can be allocated to this particular workload 145. To facilitate execution of virtual machines, the hosts 118 can execute a hypervisor and other applications and services that allow for execution and management of virtual machines on the hosts 118.

Accordingly, an administrator, using tools provided by a cloud management platform 203, can allocate additional CPU, memory, and storage resources provided by one or more hosts 118 within the cloud environment 100 to a workload. Examples of this disclosure provide a mechanism to analyze admission control policies with respect to workloads deployed in the cloud environment 100 by an enterprise to provide recommendation for policy modification that can improve failover response. With this in mind, reference is now made to FIG. 2.

Figure 2:
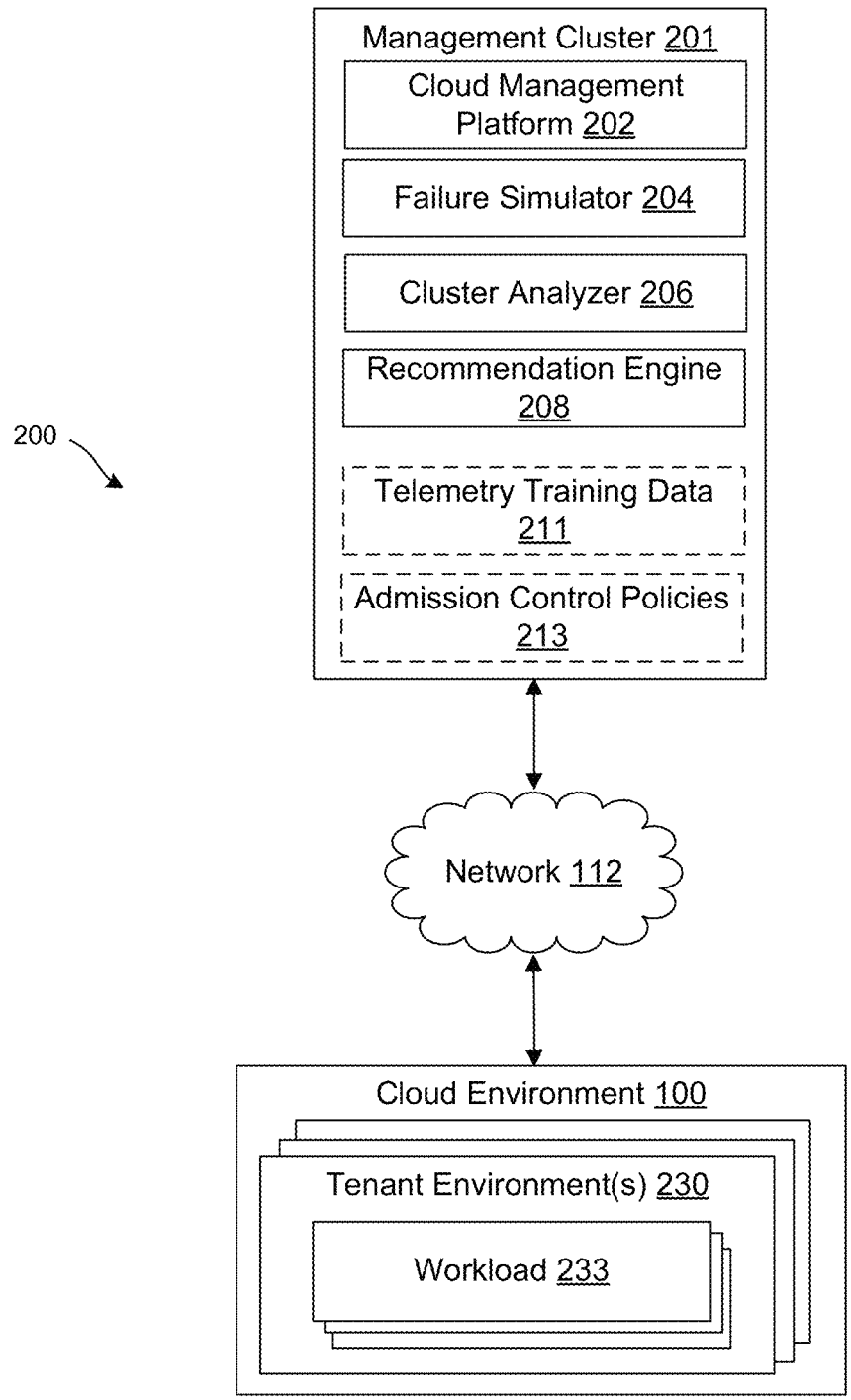
FIG. 2 is a drawing of an example of a networked environment including components connected through a network.

FIG. 2 shows is an example of components of a networked environment in communication through the network 112. The management cluster 201 represents an application or service that can be executed on a host device to manage and oversee the operation of a software defined datacenter. In one example, the management cluster 201 can execute a cloud management platform 202. The cloud management platform 202 represents an application or service that allows an administrator to manage or oversee the operation of a deployment of workloads within a cloud environment 100. VMware vSphere®, vSAN®, NSX®, ESX®, ESXi®, DRS®, a SDDC manager, and other virtualization software and tools can also be executed in the management cluster 201 and the various hosts and can work in concert with, and can be considered part of, the cloud management platform 202. The cloud management platform 202 can allow administrators to centrally monitor and administer all virtual machines, virtual machine clusters, physical host machines, workloads, workload domains, applications, and tasks across individual sites or multiple sites, including local hardware, private cloud, public cloud, and hybrid cloud deployments. The cloud management platform 202 can also allow administrators to manage and deploy logical hardware resources, such as data stores, virtual machines, logical switches, logical routers, or other logical devices that are implemented on host devices within a software defined datacenter.

Administrators can deploy and manage workload domains in physical, virtual, and cloud environments with a unified management experience through at least one user interface generated by the cloud management platform 202. For example, administrators can create new workloads or workload domains through the user interface of the cloud management platform 202. Additionally, hosts can be manually assigned and shifted within the available hosts through the user interface of the cloud management platform 202. Administrators can configure and change properties, settings, and other configurations for particular workload domains. For example, a particular workload domain can be configured to have a certain priority, such as a low-priority workload domain setting or a high-priority workload domain setting. A particular workload domain can be further manually set to have a particular expected bandwidth requirement.

Administrators, using the cloud management platform 202, can set admission control policies that define the behavior of a cluster of virtual machines and physical host machines assigned to enterprise with respect to failover. As described above, various admission control policies can configure how a cluster of VMs behaves with respect to failover when a physical host machines fails or requires maintenance, restarting, or other events that cause downtime. Admission control policies can apply to a tenant environment 230 for a customer or tenant in a multi-tenant environment.

The cloud management platform 202 can allow an administrator to manage a tenant environment 230 for a customer or tenant in the multi-tenant environment. A tenant environment 230 can represent a set of workloads 233 or virtual machines that are running on behalf of a tenant within the cloud environment 100. Various tenant environments 230 can be implemented by various tenants across the hosts 118 within one or more racks 103 of a networked environment. A tenant environment 230 can include physical host machines, or physical computing resources such as CPU and memory resources, that are allocated to the tenant environment 230. In a hybrid cloud environment, these resources are often metered and charged to an enterprise customer. Accordingly, efficient use of these resources can be an important consideration when planning for failover scenarios.

Workloads 233 can represent virtual machines or applications executed on host devices within cloud environment 100. Workloads 233 can be executed on a host device that runs a hypervisor that facilitates access to the physical resources of the host device by workloads 233 running atop the hypervisor. For example, VDI functionalities, IaaS functionalities, SaaS functionalities, IoT functionalities, VMware® Photon OS, AirWatch®, and other functionalities and application types can be provided by executing workloads 233 on hosts 118. A group of workloads 233 that are associated with a particular tenant can be considered a workload domain of the tenant.

The cloud management platform 202 can communicate with a service implemented on a host 118 within the cloud environment 100 that can manage workloads 233 executed by the cloud environment 100. For example, a management service or management workload can be executed on a host 118 that can create or destroy workloads 233 executed on one or more hosts 118. For example, if an administrator of a particular tenant environment 230 creates a virtual machine and requests that it be deployed within the cloud environment 100, a management workload can determine which host 118 has available resources within the cloud environment 100 and cause the virtual machine to be executed on the appropriate host 118.

The failure simulator 204 can perform simulations that simulate the failure of one or more physical host machines assigned to the enterprise. The simulations can simulate the effect on one or more host failures on the ability of the cluster of virtual machines of the enterprise to recover or failover to resources set aside for failover. In other words, the simulations can simulate the ability of a cluster of virtual machines to withstand the failure of one or more hosts on which the cluster depends.

The failure simulator 204 can simulate how a group of VMs would behave when they are moved from their parent host to a destination host in the event of a host failure. The failure simulator 204 can place VMs in the cluster into three categories after running the simulation. The first category is that one or more of the VMs from the cluster will simply fail to restart as a result of the simulated host failure. The second category specifies that the VMs in the cluster will restart or run with significant disruption or resource degradation. The third category specifies that the VMs will restart or run with minimal or no disruption or resource degradation. In some embodiments, the results of a particular simulation can be presented to a user in a user interface through the cloud management platform 202. The threshold of determining whether resources are minimally or significantly disrupted can be a user-configurable setting. The setting can be expressed in terms of CPU, memory, or network utilization of a particular physical host machine after taking on the load of VMs relocated to the host after the failure or another host assigned to the enterprise. If any of the CPU, memory, or network utilization metrics for a physical host are above a respective threshold value, the failure simulator 204 can deem the VMs as undergoing significant resource disruption.

The failure simulator 204 can run simulations for various admission control policies for a particular cluster of virtual machines and generate a score for each simulation. The score can represent an availability and performance score and expresses the ability of the cluster of virtual machines to successfully failover to other physical host machines within the cloud environment 100 that are allocated to the enterprise. The various simulations can be run using different admission control policy settings for each admission control policy and generate the score for each simulation. The score represents a prediction as to how the cluster of VMs will recover from the simulated physical host machine failure. The admission control policy configuration and score associated with the simulations can be fed into the cluster analyzer 206, which employs a machine-learning process to generate recommendations as to how the admission control policies can be changed to improve the failover capabilities of the VM cluster.

The cluster analyzer 206 can take various inputs and generate its own prediction as to how a particular cluster of VMs with a particular admission control policy will perform in response to a failure. The cluster analyzer 206 can comprise a machine-learning trained model that is trained based upon telemetry training data 211 obtained by the management cluster 201. The telemetry training data 211 can correspond to configuration data of other deployments of other customers within the cloud environment 100. The telemetry training data 211 can correspond to admission control policies and failure data for other deployments. For example, the telemetry training data 211 for other customer deployments includes the settings for the admission control policies as well as an indication of whether the deployment encountered a failure of a physical host machine. The telemetry training data 211 can also provide an indication of whether the deployment or cluster of VMs encountered resource degradation or VM restart failures upon failover.

The telemetry training data 211 can place other customer deployments into one of three buckets or categories. A first category is one that indicates that the cluster of virtual machines restarted or failed over without issues or with minimal resource degradation in response to the failure of a physical host machine. The second category indicates that the cluster restarted or failed over with minimal or no resource degradation. The third category indicates that the cluster had one or more failures in attempting to failover upon failure of a physical host machine.

The telemetry training data 211 can also include other parameters that are used as a training data set for a machine learning process. The parameters can include an availability and performance score that was calculated for the deployment, the various admission control policy settings, and a cost parameter that expresses a cost within the cloud environment 100 of the deployment. The cost parameter can be based upon a CPU size of a physical host machine, a memory size, a storage size, and a network bandwidth allocated to the machine. The cost can also be based upon the failover level policy that specifies specify number of number of physical host machine failures in a cluster that can be tolerated. Other parameters that can feed the machine learning process can include a VM memory reservation policy, a number of VMs in a cluster, a total number of physical host machines allocated to the cluster of VMs, and a CPU count.

In one example, the cost parameter can expressed according to following equation.

$$\text{Cost} = \sqrt{m^2 + s^2 + n^2 + h^2 + c^2}$$

In the above equation, m is the host memory size, s is the host storage size, n is the host network size, h is the host failures to tolerate in the failover level policy, and c is the CPU size.

A principal component analysis (PCA) can be performed on the cost parameter and other parameters fed from the telemetry training data 211 to reduce the parameters into a function that yields fewer variable parameters. For example, the PCA dimensionality reduction process can reduce the parameters to two variables. The basis of PCA-based dimension reduction is that PCA picks up the dimensions with the largest variances. Mathematically, this is equivalent to finding the best low rank approximation of the data through singular value decomposition (SVD). Additionally, with lesser features to compute after PCA, it becomes less costly to cluster the data into three bins representing the three categories of VM reactions using K-means clustering.

The K-means method uses K centroids of clusters to characterize the data. They are determined by minimizing the sum of squared errors:

$$J_k = \sum_{k=1}^{K} \sum_{i \in C_k} (x_i - m_k)^2$$

where $(x_1, \ldots, x_n) = X$ is the data matrix and $$m_k = \sum_{i \in C_k} \frac{x_i}{n_k}$$

is the centroid of the cluster $C_k$ and $n_k$ is the number of points in $C_k$. When performing K-means clustering, a caveat is to know the quantity of bins or categories that data are grouped into. In this case, K=3 given the categories of information that the telemetry training data 211. Again, the algorithm is trained using data from various customers of the cloud environment 100.

Once trained, the cluster analyzer 206 can generate a prediction for a category that a particular enterprise's deployment will fall into. Again, the first category is one that indicates that the cluster of virtual machines restarted or failed over without issues or with minimal resource degradation in response to the failure of a physical host machine. The second category indicates that the cluster restarted or failed over with minimal or no resource degradation. The third category indicates that the cluster had one or more failures in attempting to failover upon failure of a physical host machine.

When analyzing a particular deployment, if a prediction generated by the cluster analyzer 206 indicates that the deployment will not restart with minimal or no resource disruption, the cluster analyzer 206 can identify a most similar setup from the telemetry training data 211. The most similar setup can be determined by calculating a Euclidean distance between a point associated with the deployment and the nearest point characterizing the various setups from the telemetry training data 211. Additionally, the cluster analyzer 206 can identify the nearest point that is in the category that indicates that the cluster of VMs failed over without issues or with minimal resource degradation.

The recommendation engine 208 can generate recommended admission control policies that can make the deployment most similar to the deployment corresponding to the nearest point in the category that failed over with minimal resource degradation. The recommendation engine 208 can identify the differences in admission control policies between the deployment being analyzed and its nearest neighbor with minimal resource degradation and present recommendations to an administrator through the cloud management platform 202.

Figure 3:
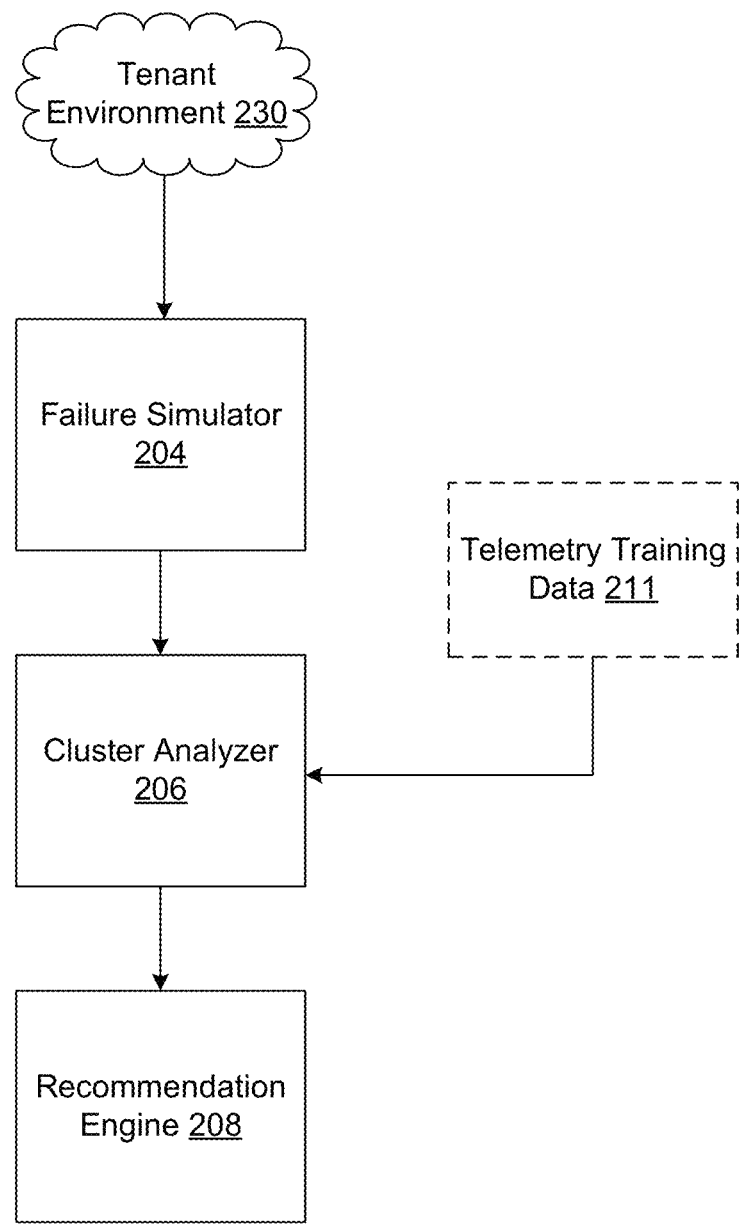
FIG. 3 is a drawing further illustrating components of the networked environment of FIG. 1.

Referring to FIG. 3, shown is diagram describing information flow between the components shown in FIG. 2. FIG. 3 illustrates how the cluster analyzer 206 and recommendation engine 208 can generate a prediction for whether the admission control policy settings of a deployment will be result in significant resource degradation or VM restart failures when a physical host machine fails. The cluster analyzer 206 and recommendation engine 208 can also generate recommended admission control policy settings that should be changed to result in a deployment that fails over gracefully or without significant disruption.

First, the configuration details of the admission control policies, the VM cluster configuration, and physical host machine configurations of a particular tenant environment 230 are provided to the failure simulator 204. The failure simulator 204 can perform simulations that simulate the failure of one or more physical host machines assigned to the enterprise. The simulations can simulate the effect on one or more host failures on the ability of the cluster of virtual machines of the enterprise to recover or failover to resources set aside for failover. The failure simulator 204 can also score the various simulations using the different admission control policy settings and generate the availability and performance score for each simulation.

The failure simulator 204 can select the simulation having the highest score and feed the admission control settings into the cluster analyzer 206. As noted above, the cluster analyzer 206 is trained using telemetry training data 211 taken from other customer deployments within the cloud environment 100. The cluster analyzer 206 can then generate a prediction of the deployment using the admission control settings of the highest scored simulation. In some examples, the cluster analyzer 206 can identify a prediction for multiple admission control settings corresponding to multiple simulations. In turn the recommendation engine 208 can generate recommendations for the multiple simulated deployments.

If a simulation results in a prediction that the deployment will be unable to failover without significant resource degradation or VM failure, the recommendation engine 208 can then generate one or more recommendation for changes in the admission control policies of the deployment.

The recommendation engine 208 can generate recommended admission control policies that can make the deployment most similar to or identical to the deployment corresponding to the nearest point in the category that failed over with minimal or no resource degradation. The recommendation engine 208 can identify the differences in admission control policies between the deployment being analyzed and its nearest neighbor with minimal resource degradation and present recommendations to an administrator through the cloud management platform 202.

Figure 4:
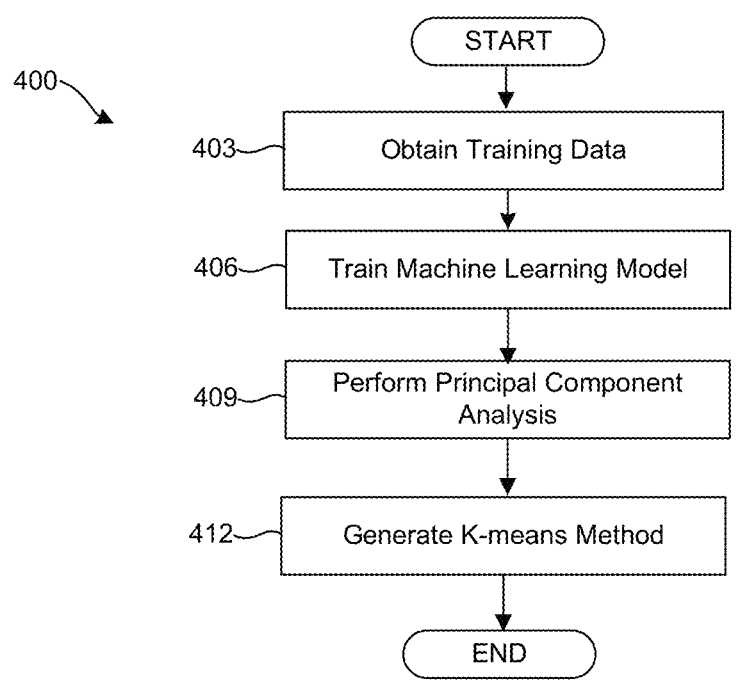
FIG. 4 is an example flowchart illustrating functionalities implemented by components of the networked environment.

Referring to FIG. 4, shown is an example flowchart 400 describing steps that can be performed by the components of the cloud environment 100 of FIG. 1. Generally, the flowchart 400 describes how the cluster analyzer 206 can generate a cluster method that can generate predictions regarding whether a particular cluster of VMs associated with an enterprise will experience resource degradation or failure in attempting to failover in response to a physical host machine failure.

First, at step 403, cluster analyzer 206 can obtain telemetry training data 211 associated with a population of deployments of VM clusters within the cloud environment 100. The population of VM clusters can correspond to other customer deployments within the cloud environment 100. The telemetry training data 211 can correspond to configuration data of other deployments of other customers within the cloud environment 100. The telemetry training data 211 can correspond to admission control policies and failure data for other customer deployments. For example, the telemetry training data 211 for other customer deployments includes the settings for the admission control policies as well as an indication of whether the deployment encountered a failure of a physical host machine. The telemetry training data 211 can also provide an indication of whether the deployment or cluster of VMs encountered resource degradation or VM restart failures upon failover. Additionally, as noted above, the telemetry training data 211 can place other customer deployments into one of three buckets or categories.

At step 406, the cluster analyzer 206 can train a machine learning model based on the telemetry training data 211. The machine learning model can be trained by creating a model from the telemetry training data 211 that reaches the outcomes that are also specified within the telemetry.

At step 409, the cluster analyzer 206 can perform a PCA to reduce the dimensionality of the machine learning model. A principal component analysis (PCA) can be performed on the cost parameter and other parameters fed from the telemetry training data 211 to reduce the parameters into a function that yields fewer variable parameters. For example, the PCA dimensionality reduction process can reduce the parameters to two variables.

At step 412, after PCA is performed, a K-means clustering method is generated. In the K-means method, K=3 because the method can generate a prediction that categorizes a deployment into one of three buckets or categories. Again, the first category is one that indicates that the cluster of virtual machines restarted or failed over without issues or with minimal resource degradation in response to the failure of a physical host machine. The second category indicates that the cluster restarted or failed over with minimal or no resource degradation. The third category indicates that the cluster had one or more failures in attempting to failover upon failure of a physical host machine. Thereafter, the process proceeds to completion.

Figure 5:
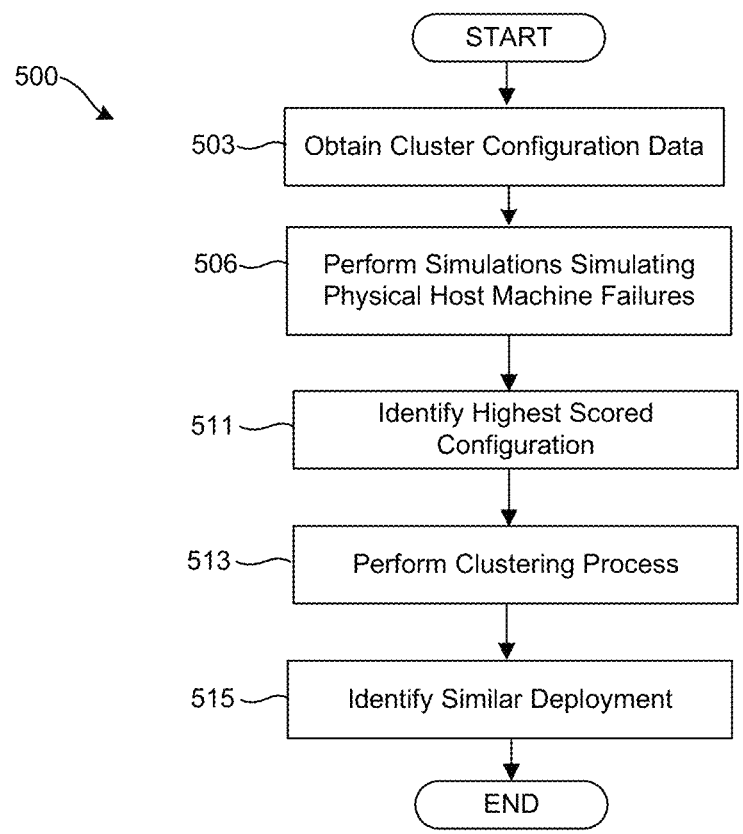
FIG. 5 is an example flowchart illustrating functionalities implemented by components of the networked environment.

Referring to FIG. 5, shown is an example flowchart 500 describing steps that can be performed by the components of the cloud environment 100 of FIG. 1. Generally, the flowchart 500 describes how the management cluster 201 can analyze a customer deployment within the cloud environment 100 of a cluster of VMs running on various physical host machines. The management cluster 201 can generate a prediction of a category that the deployment is in and identify a similar deployment in the cloud environment 100.

At step 503, the failure simulator 204 can obtain cluster configuration data regarding a tenant environment 230 in the cloud environment 100. The cluster configuration data represents admission control policy settings and other information about a cluster of VMs assigned to a particular enterprise in the cloud environment 100. The cluster configuration data also represents the physical host machines that are allocated to the enterprise. For example, in a cloud environment 100, an enterprise can obtain or reserve a certain quantity of CPU and memory resources. The quantity of computing resources allocated to the enterprise can be equated to physical host machine usage of the enterprise.

At step 506, the failure simulator 204 can perform simulations simulating physical host machine failures related to the customer deployment. The simulations can simulate the effect on one or more host failures on the ability of the cluster of virtual machines of the enterprise to recover or failover to resources set aside for failover. In other words, the simulations can simulate the ability of a cluster of virtual machines to withstand the failure of one or more hosts on which the cluster depends.

At step 511, the failure simulator 204 can select the simulation having the highest score and feed the admission control settings into the cluster analyzer 206. As noted above, the cluster analyzer 206 is trained using telemetry training data 211 taken from other customer deployments within the cloud environment 100. The cluster analyzer 206 can then generate a prediction of the deployment using the admission control settings of the highest scored simulation.

At step 513, the cluster analyzer 206 can generate a prediction for a category that a particular enterprise's deployment will fall into by performing a clustering process. Again, the first category is one that indicates that the cluster of virtual machines restarted or failed over without issues or with minimal resource degradation in response to the failure of a physical host machine. The second category indicates that the cluster restarted or failed over with minimal or no resource degradation. The third category indicates that the cluster had one or more failures in attempting to failover upon failure of a physical host machine.

At step 515, the cluster analyzer 206 can identify a most similar setup from the telemetry training data 211. The most similar setup can be determined by calculating a Euclidean distance between a point associated with the deployment and the nearest point characterizing the various setups from the telemetry training data 211. Additionally, the cluster analyzer 206 can identify the nearest point that is in the category that indicates that the cluster of VMs failed over without issues or with minimal resource degradation. Thereafter, the process proceeds to completion.

A number of software components are stored in the memory and executable by a processor. In this respect, the term "executable" means a program file that is in a form that can ultimately be run by the processor. Examples of executable programs can be a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the cloud management platform 203 or other applications and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a computer-readable medium can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A method, comprising:
   identifying, by at least one computing device, a cluster of virtual machines executed in computing environment;
   performing, by the at least one computing device, a plurality of simulations for the cluster of virtual machines, the plurality of simulations simulating a failure of one or more hosts in the computing environment, the plurality of simulations further simulating an effect on the cluster of virtual machines as a result of the failure;
   generating, by the at least one computing device, a score for respective ones of the simulations, the score representing the effect on the cluster of virtual machines;
   performing, by the at least one computing device, a clustering process on one of the simulations based upon on the score, the clustering process being trained using data from at least one other deployment within a converged infrastructure environment; and
   identifying, by the at least one computing device, based on the clustering process, a most similar deployment to the cluster of virtual machines within the computing environment.

2. The method of claim 1, wherein the plurality of buckets comprise one of: a first prediction that the cluster of virtual machines will restart with minimal resource degradation, a second prediction that the cluster of virtual machines will restart with resource degradation, or a third prediction that the one or more of the cluster of virtual machines will not restart.

3. The method of claim 1, wherein the plurality of policy parameters specify at least one of: a CPU reservation policy for the plurality of hosts, a memory reservation policy for the plurality of host, a failover level policy, or a host-specific failover policy.

4. The method of claim 1, wherein the clustering process comprises a k-means clustering process performed on the score and the policy parameters.

5. The method of claim 1, wherein identifying a most similar deployment further comprises:
   identifying a configuration of another deployment of a cluster of virtual machines having the smallest Euclidian distance between a first point representing the one of the simulations and a second point representing the other deployment, wherein the other deployment is associated with a prediction that a corresponding cluster of virtual machines associated with the other deployment will restart with minimal resource degradation.

6. The method of claim 5, further comprising:
generating at least one recommendation to modify the plurality of policy parameters to match a corresponding plurality of policy parameters associated with the other deployment.

7. The method of claim 1, wherein the score represents an availability and performance score.

8. A system comprising:
at least one computing device;
an application executed by the at least one computing device, the application causing the at least one computing device to at least:
identify a cluster of virtual machines executed in computing environment;
perform a plurality of simulations for the cluster of virtual machines, the plurality of simulations simulating a failure of one or more hosts in the computing environment, the plurality of simulations further simulating an effect on the cluster of virtual machines as a result of the failure;
generate a score for respective ones of the simulations, the score representing the effect on the cluster of virtual machines;
perform a clustering process on one of the simulations based upon on the score, the clustering process being trained using data from at least one other deployment within a converged infrastructure environment; and
identify based on the clustering process, a most similar deployment to the cluster of virtual machines within the computing environment.

9. The system of claim 8, wherein the plurality of buckets comprise one of: a first prediction that the cluster of virtual machines will restart with minimal resource degradation, a second prediction that the cluster of virtual machines will restart with resource degradation, or a third prediction that the one or more of the cluster of virtual machines will not restart.

10. The system of claim 8, wherein the plurality of policy parameters specify at least one of: a CPU reservation policy for the plurality of hosts, a memory reservation policy for the plurality of hosts, a failover level policy, or a host-specific failover policy.

11. The system of claim 8, wherein the clustering process comprises a k-means clustering process performed on the score and the policy parameters.

12. The system of claim 8, wherein a most similar deployment is identified by:
identifying a configuration of another deployment of a cluster of virtual machines having the smallest Euclidian distance between a first point representing the one of the simulations and a second point representing the other deployment, wherein the other deployment is associated with a prediction that a corresponding cluster of virtual machines associated with the other deployment will restart with minimal resource degradation.

13. The system of claim 12, wherein the application further causes the at least one computing device to at least:

generate at least one recommendation to modify the plurality of policy parameters to match a corresponding plurality of policy parameters associated with the other deployment.

14. The system of claim 8, wherein the score represents an availability and performance score.

15. A non-transitory computer-readable medium embodying a program executed by at least one computing device, the program causing the at least one computing device to at least:
identify a cluster of virtual machines executed in computing environment;
perform a plurality of simulations for the cluster of virtual machines, the plurality of simulations simulating a failure of one or more hosts in the computing environment, the plurality of simulations further simulating an effect on the cluster of virtual machines as a result of the failure;
generate a score for respective ones of the simulations, the score representing the effect on the cluster of virtual machines;
perform a clustering process on one of the simulations based upon on the score, the clustering process being trained using data from at least one other deployment within a converged infrastructure environment; and
identify based on the clustering process, a most similar deployment to the cluster of virtual machines within the computing environment.

16. The non-transitory computer-readable medium of claim 15, wherein the plurality of buckets comprise one of: a first prediction that the cluster of virtual machines will restart with minimal resource degradation, a second prediction that the cluster of virtual machines will restart with resource degradation, or a third prediction that the one or more of the cluster of virtual machines will not restart.

17. The non-transitory computer-readable medium of claim 15, wherein the plurality of policy parameters specify at least one of: a CPU reservation policy for the plurality of hosts, a memory reservation policy for the plurality of hosts, a failover level policy, or a host-specific failover policy.

18. The non-transitory computer-readable medium of claim 15, wherein the clustering process comprises a k-means clustering process performed on the score and the policy parameters.

19. The non-transitory computer-readable medium of claim 15, wherein a most similar deployment is identified by:
identifying a configuration of another deployment of a cluster of virtual machines having the smallest Euclidian distance between a first point representing the one of the simulations and a second point representing the other deployment, wherein the other deployment is associated with a prediction that a corresponding cluster of virtual machines associated with the other deployment will restart with minimal resource degradation.

20. The non-transitory computer-readable medium of claim 19, wherein the application further causes the at least one computing device to at least:
generate at least one recommendation to modify the plurality of policy parameters to match a corresponding plurality of policy parameters associated with the other deployment.

* * * * *